(12) United States Patent
Kappelman et al.

(10) Patent No.: US 10,080,378 B2
(45) Date of Patent: Sep. 25, 2018

(54) HIGHLY DIGESTIBLE PET FOOD FOR IMPROVING STOOL QUALITY

(75) Inventors: David Kappelman, Olathe, KS (US);
Susy Tejayadi, Lawrence, KS (US);
Valerie Proctor, Topeka, KS (US)

(73) Assignee: Colgate-Palmolive Company, New York, NY (US)

( * ) Notice: Subject to any disclaimer, the term of this patent is extended or adjusted under 35 U.S.C. 154(b) by 1083 days.

(21) Appl. No.: 14/363,805

(22) PCT Filed: Dec. 19, 2011

(86) PCT No.: PCT/US2011/065739
§ 371 (c)(1),
(2), (4) Date: Jun. 8, 2014

(87) PCT Pub. No.: WO2013/095323
PCT Pub. Date: Jun. 27, 2013

(65) Prior Publication Data
US 2014/0370148 A1  Dec. 18, 2014

(51) Int. Cl.
| A23K 10/30 | (2016.01) |
| A23K 1/18 | (2006.01) |
| A23K 10/20 | (2016.01) |
| A23K 20/147 | (2016.01) |
| A23K 20/24 | (2016.01) |
| A23K 20/26 | (2016.01) |
| A23K 50/40 | (2016.01) |
| A23K 50/42 | (2016.01) |

(52) U.S. Cl.
CPC ............ *A23K 1/1853* (2013.01); *A23K 10/20* (2016.05); *A23K 10/30* (2016.05); *A23K 20/147* (2016.05); *A23K 20/24* (2016.05); *A23K 20/26* (2016.05); *A23K 50/40* (2016.05); *A23K 50/42* (2016.05)

(58) Field of Classification Search
CPC ...... A23K 20/147; A23K 20/24; A23K 20/26; A23K 50/40; A23K 50/42; A23K 10/20; A23K 10/30
See application file for complete search history.

(56) References Cited

U.S. PATENT DOCUMENTS

| 7,722,905 B2 * | 5/2010 | Khoo ..................... A23K 10/30 424/756 |
| 2005/0112179 A1 | 5/2005 | Khoo |
| 2005/0112217 A1 | 5/2005 | Khoo |
| 2005/0118299 A1 | 6/2005 | Vickers et al. |
| 2006/0228448 A1 | 10/2006 | Boileau et al. |
| 2006/0269534 A1 | 11/2006 | Boileau et al. |
| 2007/0190171 A1 | 8/2007 | Yamka et al. |
| 2007/0218164 A1 * | 9/2007 | Stojanovic ............ A61K 35/744 426/2 |
| 2009/0004165 A1 | 1/2009 | Boileau et al. |
| 2009/0214499 A1 | 8/2009 | Boileau et al. |
| 2010/0233312 A9 | 9/2010 | Stojanovic |
| 2012/0028891 A1 * | 2/2012 | Paetau-Robinson ........ A61K 35/34 514/4.8 |

FOREIGN PATENT DOCUMENTS

| EP | 2014175 | 1/2009 |
| GB | 2303043 | 12/1997 |
| WO | WO2005053422 | 6/2005 |
| WO | WO 2009/008883 | 1/2009 |

OTHER PUBLICATIONS

Yamka et al. J. Anim. Sci 2003, 81:2279-2284.*
"Rothsay" downloaded from www.rothsay.ca/products/pet_food_ingredients/low_ash_poultry_meal/, 2 pages, dated Sep. 2009.*
The Pride 21-17 & 27-20 Pro Series Dog Food downloaded from www.thepridedogfood.com/index.php?option=com_content&view=article, dated Apr. 22, 2011, 3 pages.*
The diet formulation of Pride dog food 21-17 downloaded from the internet wayback machine dated Sep. 10, 2010, 1 page, downloaded from http://www.the pridedogfood.com:80downloads/ThePrideProSeries21-17.pdf.*
"Calcium Chloride", PubChem downloaded from https://pubchem.ncbi.nlm.nih.gov./compound/Calcium_dichloride#section=Top on Mar. 7, 2018.*
"Carbonate chemistry—Science Learning Hub" downloaded from https://sciencelearn.org.nz/resources/469-carbonate-chemistry on Mar. 7, 2018.*
Pastoor et al. Veterinary Quarterly 1994(16); 3:157-60.*
Brambillasca et al. Can. Vet J 2010, 51:190-194.*
Yamka et al., 2003, "Evaluation of low-ash poultry meal as a protein source in canine foods," J. Animal. Sci. 81(9):2279-2284
International Search Report and the Written Opinion issued in International Application PCT/US2011/65739 dated Sep. 19, 2012.
Written Opinion of the International Preliminary Examining Authority issued in International Application PCT/US2011/65739 dated Nov. 19, 2013.
Yamka R M et al: "Evaluation of maize gluten meal as a protein source in canine foods", Animal Feed Science and Technology, Elsevier, Amsterdam, NL, vol. 116, No. 3-4, Oct. 15, 2004, pp. 239-248, XP004573571, ISSN: 0377-8401, DOI: 10.1016/J.ANIFEEDSCI.2004.06.007.
T P Keegan, et al: "The Effects of Poultry Meal Source on Growth Performance of Weanling Pigs 1", Jan. 1, 2003, pp. 102-105, XP055087118, Retrieved from the internet: URL:http://krex.k-state.edu/dspace/handle/2097/2111 [retrived on Nov. 7, 2013].
John R. Johnson et al: "Effect of species raw material source, ash content, and processing temperature on amino acid digestibility of animal by-product meals by cecectomized roosters and ileally cannulated dogs", Organic Syntheses, vol. 76, No. 4, Apr. 1, 1998, pp. 1112-1122, XP055087144, Hoboken, NJ, USA, DOI: 10.1002/0471264180.os008.13, ISBN:978-0-47-126422-4.

* cited by examiner

*Primary Examiner* — Chhaya Sayala

(57) ABSTRACT

The present disclosure provides highly digestible pet food compositions that, when ingested by an animal, result in reduced stool volume, weight, and odor, and methods of use employing those compositions.

19 Claims, No Drawings

HIGHLY DIGESTIBLE PET FOOD FOR IMPROVING STOOL QUALITY

CROSS-REFERENCE TO RELATED PATENT APPLICATIONS

The present application is a U.S. national stage entry under 35 U.S.C. § 371 of Patent Cooperation Treaty Patent Application No. PCT/US2011/65739, filed Dec. 19, 2011.

FIELD OF THE INVENTION

The present invention relates to highly digestible pet food compositions and methods for reducing stool volume, weight, and odor by feeding a companion animal a pet food composition of the disclosure.

BACKGROUND OF THE INVENTION

Pets produce stool, and defecation may occur in any number of places, both outdoors as well as in litter boxes. Cleaning up pet feces is often unpleasant, and although many products are marketed to make this task as pleasant as possible, the products fail to address the underlying problem of stool production, volume of stool produced, and unpleasant odors associated with excreta. It would be desirable to develop compositions and methods to reduce stool produced by an animal, either by weight or volume, and to reduce excreta-associated odors.

BRIEF SUMMARY OF THE INVENTION

Provided herein are methods for improving stool quality in an animal in need thereof, the method comprising causing the animal to ingest a stool quality improving quality amount of a highly digestible dry food composition comprising: (a) from about 10% to about 60% vegetable protein; (b) from about 5% to about 30% whole grain; (c) from about 5% to about 20% starch; (d) from about 1% to about 15% non-meat animal protein; (e) and from about 1% to about 15% low ash animal protein, in which the dry matter digestibility of the composition is at least about 85%, and in which the dietary fiber content is less than 5%.

Also provided are the compositions useful and effective in the methods described herein.

In specific aspects, the described methods are useful for reduction of the volume, weight, and odor of stool produced according to the described methods that comprise feeding an animal in need thereof the presently described compositions.

In other aspects, the animal is a companion animal, such as a feline or canine, and in a particular aspect, the animal is a feline.

In particular embodiments, the digestibility of each of the true protein, fat, energy, and carbohydrate of the compositions is at least about 90%.

In particular embodiments, the vegetable protein is corn gluten meal, the whole grain is rice, the starch is native rice starch, the non-meat animal protein is dried egg, and the low-ash animal protein is low-ash poultry meal.

In one embodiment, a composition of the present disclosure this is useful in the methods of the present disclosure, comprises about 36% corn gluten meal, about 15% rice, about 15% native rice starch, about 6% dried egg, and about 6% low-ash poultry meal, with total dietary fiber at less than about 3% and total ash content at less than about 5%.

In particular aspects, the compositions of the present disclosure comprise calcium salts that are more water-soluble than calcium carbonate and phosphate salts that are more water-soluble than calcium phosphate. In a specific aspect, compositions of the present disclosure comprise calcium chloride, $CaCl_2$, and monosodium phosphate, $NaH_2PO_4$.

In other aspects, the compositions of the present disclosure also comprise either or both of an excreta odor suppressing amount of a zingiberaceous spice and an excreta odor suppressing amount of a zinc salt. In a specific aspect, compositions of the present disclosure comprise ground ginger and zinc acetate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

The following description of illustrative and preferred embodiments is merely exemplary in nature and is in no way intended to limit the invention, its application, or uses.

Without being limited to any theories or particular modes of action of the invention, the present invention is based on the discovery that certain compositions, when ingested by an animal, can result in less stool production and the excreta, e.g., the stool, produced has a reduced or less-offensive odor. Generally, the compositions and individual components thereof are highly digestible, comprising, e.g., highly digestible proteins and highly digestible carbohydrates. In particular, it has been surprisingly discovered that the lowered excreta volume, weight, and odor reflect the combined, synergistic effects of the components of the formulation disclosed, particularly with respect to the use of high levels of digestible starch, particularly rice starch as the carbohydrate source, the use of lower levels of animal protein and higher levels of a vegetable protein, such as corn gluten meal, limiting the dietary fiber to levels of less than about 5%, less than about 3%, and less than about 2.5%, limiting the ash content to levels of less than about 10%, about 8%, about 7%, e.g., to about 5.2%. These results are also supported and enhanced by the use of relatively more water soluble salts, e.g., $CaCl_2$ and $NaH_2PO_4$, controlling the cation/anion balance to target a urine pH of from about pH 6.2 to about pH 6.4, and the addition of a zingiberaceous spice, e.g., ginger, including ground ginger, as well as, in certain embodiments, a zinc salt.

As used herein and in the appended claims, the singular forms "a," "an," and "the" include plural reference unless the context clearly dictates otherwise.

The compositions described herein may comprise, consist essentially of, or consist of any of the components described herein.

As used herein, "an amount effective," "an effective amount," and like terms refer to that amount of a compound, material or composition as described herein that may be effective to achieve a particular biological result, e.g., to reduce stool volume, stool weight, and to reduce stool odor. Such results may be achieved, for example, by administration of the compositions of the present invention to an animal. An effective amount may be based on several factors, including the particular animal, sex, age, weight, and/or the metabolizable energy of the composition. As contemplated herein, the daily amount of the food compositions to be fed to an animal are familiar to one of skill in the art.

As used herein, a "highly digestible composition" refers to a composition that has a digestibility of greater than or equal to 88.0%. The term "nutrient digestibility" includes the digestibility of dry matter, protein, fat, carbohydrate, and energy.

The present disclosure relates to any animal, e.g., to a mammal and more specifically to a companion animal that may benefit from feeding the formulations disclosed herein. The term "companion animal" refers to any animal that lives in close association with humans and includes, but is not limited to, pet canines and felines of any breed. For example, it is contemplated herein that this term may also encompass any animal whose diet may be controlled by humans and which may benefit from feeding the formulations disclosed herein. These animals may include, e.g., domesticated farm animals (e.g. cattle, horses, swine, etc.) as well as undomesticated animals held in captivity, e.g. in zoological parks and the like. In a specific embodiment, the animal is a feline or canine, and, even more specifically, the animal is a feline.

The present invention may be suitable for use with animals in various stages in life, including lactation, weaning, growth, adult, senior, and geriatric. In specific embodiments, the animal is an adult, senior, or geriatric animal, and particularly, an adult animal.

Except to the extent stated otherwise, all percentages used in this specification are weight percentages on a dry matter basis. The phrase "dry matter basis" means the component concentration in the composition after any moisture in the composition is removed.

Methods for determining the digestibility of proteins are known by those of skill in the art. For example, protein content of compositions may be determined by any number of methods known by those of skill in the art, for example, e.g., as disclosed in Yamka, et al. (2003) *J. Animal. Sci.* 81: 2279-2284 (and references cited therein), as well as according to the methods published by the Association of Official Analytical Chemists in Official Methods of Analysis ("OMA"), method 988.05. Thus, in order to determine "apparent protein digestibility," one of skill in the art would determine the protein content of a composition and the protein content of stool produced by feeding the animal the composition. The apparent protein digestibility is then calculated as follows:

$$\frac{(\text{amount of protein consumed} - \text{protein content of stool})}{(\text{amount of protein consumed})} \times 100\%$$

It is known that stool contains many other protein sources, e.g., bacterial proteins, enzymes produced by the digestion process, and bile. Thus, protein digestibility may be skewed by the presence of endogenous proteins in the stool. Thus, the apparent protein digestibility is often multiplied by a factor to take into account the presence of such endogenous proteins to determine a true protein digestibility percentage. Depending on the amount of endogenous proteins present, the factor may be increased or decreased. In the present invention, the true protein digestibility is determined by multiplying the protein digestibility by a factor of 1.051. That is, the difference between true protein digestibility and apparent protein digestibility is 1.051 such that, e.g., an apparent protein digestibility of 88.5% would equate to 93.0% true protein digestibility.

Sources of protein suitable for use in the compositions and methods described herein include plant sources, non-meat animal sources, animal sources, and combinations thereof. However, as noted above, compositions formulated with relatively higher levels of vegetable protein, and relatively lower levels of non-meat animal protein, and low-ash animal meal contribute to the unexpectedly improved results obtained. In particular embodiments, the compositions described herein comprise corn gluten meal, dried egg, and low-ash poultry meal. With the guidance provided herein, one skilled in the art would be expected to identify, analyze, and test other protein sources, to find any that might be functionally equivalent to those described.

As contemplated herein, the compositions of the present invention may include from about 10% to about 60%, from about 20% to about 50%, from about 25% to about 45%, and from about 30% to about 40%, vegetable protein; from about 1% to about 15%, from about 2% to about 10%, from about 3% to about 9%, from about 4% to about 8%, and from about 5% to about 7%, non-meat animal protein; from about 1% to about 15%, from about 2% to about 10%, from about 3% to about 9%, from about 4% to about 8%, and from about 5% to about 7% low-ash animal protein. In a particular embodiment, a composition of the present invention may comprise about 36% vegetable protein, about 6% non-meat animal protein, and about 6% low-ash animal protein meal.

The highly digestible carbohydrates of the compositions describe herein are those carbohydrates that may be digested by an animal, e.g., a feline, to greater than about 90%, greater than about 91%, greater than about 92%, greater than about 93%, and greater than about 94%. Highly digestible carbohydrates may be supplied by any of a variety of sources known by those skilled in the art, including corn, wheat, rice, starch (e.g., rice and corn starch). However, as noted above, the synergistic effects of the components of the formulation disclosed, are obtained, e.g., with formulations comprising relatively high levels of digestible starch, particularly rice starch as the carbohydrate source. As contemplated herein, the compositions of the present invention may include one or more highly digestible carbohydrates, particularly rice starch, at a level of from about 5% to about 20%, from about 6% to about 19%, from about 7% to about 18%, from about 8% to about 17%, and from about 9% to about 16%. In a specific embodiment, a composition of the present disclosure comprises about 15% native rice starch.

Methods for determining the digestibility of carbohydrates are known by those of skill in the art. Carbohydrate percentage may be calculated as nitrogen free extract ("NFE"), which may be calculated as follows: NFE=100%-moisture %-protein %-fat %-ash %-crude fiber %. Thus, in order to determine the carbohydrate digestibility, one of skill in the art would determine the carbohydrate content of a composition, and the carbohydrate content of stool produced by feeding the animal the composition. The carbohydrate digestibility is then calculated by the following equation:

$$\frac{(\text{amount of carbohydrate consumed} - \text{carbohydrate content of stool})}{(\text{amount of carbohydrate consumed})} \times 100\%$$

Dry matter digestibility (DMD) is the amount of matter that is digested by an animal on a dry matter basis. In general, digestibility is determined by measuring the content ingested minus the content in the feces divided by the content ingested. Methods for determining DMD are known in the art. For example, the mass of food consumed on a dry matter basis is determined, and the mass of stool (on a dry matter basis) resulting from consumption of the food is also determined. DMD is then calculated as follows:

$$\frac{(\text{mass of food consumed} - \text{mass of stool produced})}{(\text{mass of food consumed})} \times 100\%$$

Fat and energy digestibility may also be determined as provided above, e.g.:

$$\frac{(\text{mass of fat consumed} - \text{fat content of stool})}{(\text{amount of fat consumed})} \times 100\%$$

and $$\frac{(\text{amount of energy consumed} - \text{energy content of stool})}{(\text{amount of energy consumed})} \times 100\%$$

Determination of fat and energy content in food and stool may be performed according to conventional methods familiar to one of skill in the art.

Whole grains of the compositions disclosed herein may comprise from about 5% to about 30%, from about 7.5% to about 25%, from about 10% to about 20%, and from about 12.5% to about 17.5% of the composition. In certain embodiments, the compositions described herein comprise about 15% whole grain, e.g., about 15% rice.

Compositions useful in the presently-described methods may also include either or both of a zingiberaceous spice, e.g., ginger, including ground ginger, and a zinc salt. In some embodiments, ground ginger is added to the compositions of the disclosure at level of from about 0.1% to about 5%, from about 0.25% to about 3%, or from about 0.5% to about 1.5%. In a specific embodiment, ground ginger is added to the compositions of the disclosure at level of about 1%.

In addition to causing a reduction in stool volume, and stool weight, the compositions of the present invention cause the stool produced by an animal ingesting said compositions to be reduced in odor. Methods for assaying the odor of stool are familiar to one of skill in the art. For example, qualitative assessment using human panelists such as described in the Examples provided herein may be used to rank stool odor. In addition, quantitative measurement of stool odor compounds using, e.g., gas chromatography and mass spectrometry, may be used. Stool odor compounds quantitatively assayed in excreta include sulfur containing compounds, phenols, heterocycles and indoles, carboxylic acid compounds, and ketone compounds.

As contemplated herein, the compositions of the present invention are meant to encompass nutritionally complete pet food diets. A "nutritionally complete diet" is a diet that includes sufficient nutrients for maintenance of normal health of an intended recipient animal on the diet (e.g., domestic feline or domestic canine) and is familiar to one of skill in the art.

In certain embodiments, the nutritionally complete pet food compositions disclosed herein may comprise fat. Sources of fat for the compositions of the present invention can be supplied by any of a variety of sources known by those skilled in the art, including meat, meat by-products, fish oil, and plants. Plant fat sources include wheat, flaxseed, rye, barley, rice, sorghum, corn, oats, millet, wheat germ, corn germ, soybeans, peanuts, and cottonseed, as well as oils derived from these and other plant fat sources. As contemplated herein, the compositions of the present invention may comprise from about 1% to about 20% fat, from about 3% to about 18% fat, from about 5% to about 16% fat, from about 7% to about 14% fat, and from about 9% to about 12% fat. In specific embodiments, the compositions disclosed here comprise about 2%, about 4%, about 6%, about 8%, about 10%, about 12%, about 14% fat, about 16% fat, and about 18% fat.

Vitamins and minerals may also be included in the compositions described in the instant disclosure in amounts known to those of skill in the art to avoid deficiency and maintain health. For example, the National Research Council ("NRC") provides recommended amounts of such ingredients for farm animals, and Official Publication of the Associate of American Feed Control Officials Inc., ("AAFCO") provides recommended amounts of such ingredients for canines and felines. Vitamins may include vitamin A, vitamin $B_1$, vitamin $B_2$, vitamin $B_6$, vitamin $B_{12}$, vitamin C, vitamin D, vitamin E, vitamin H (biotin), vitamin K, folic acid, inositol, niacin, and pantothenic acid. Examples of minerals include e.g., calcium, phosphorus, dicalcium phosphate, potassium citrate, potassium chloride, calcium carbonate, sodium chloride, or salts of sodium, potassium, magnesium, manganese, calcium, chloride, copper, zinc, choline, phosphorus, iodine and selenium.

Fiber, including but not limited to dietary fiber, may be included in the compositions of the present invention. Dietary fiber refers to components of a plant that are resistant to digestion by an animal's digestive enzymes. Dietary fiber components of foods may be determined by any number of methods known by those of skill in the art, such as OMA method 991.43/32.1.17 (1994). Total dietary fiber includes soluble and insoluble fibers. Soluble fiber is resistant to digestion and absorption in the small intestine, but undergoes complete or partial fermentation in the large intestine. Sources of soluble fiber for use in the compositions disclosed herein include, e.g., beet pulp, guar gum, chicory root, psyllium, pectin, blueberry, cranberry, squash, apples, oats, beans, citrus, barley, or peas. Insoluble fibers are fibers that do not dissolve in water and tend to increase the rate at which food passes through the digestive tract. Examples include, but are not limited to, cellulose, whole wheat products, wheat oat, corn bran, flax seed, grapes, celery, green beans, cauliflower, potato skins, fruit skins, vegetable skins, peanut hulls, and soy fiber. As contemplated herein, the compositions of the present invention may comprise from about 1% to about 5%, from about 1.5% to about 4%, and from about 2% to about 3%, total dietary fiber. In specific embodiments, the compositions described herein comprise less than or equal to 3.0% total dietary fiber, 2.5% total dietary fiber, less than or equal to 2.25% total dietary fiber, and about 2.25% total dietary fiber.

The compositions described herein may additionally comprise amino acids in amounts known to those of skill in the art to avoid deficiency and maintain health. Preferably, the compositions of the present invention comprise "essential amino acids." Essential amino acids are amino acids that cannot be synthesized de novo, or in sufficient quantities by an organism and thus must be supplied in the diet. Essential amino acids vary from species to species, depending upon the organism's metabolism. For example, it is generally understood that the essential amino acids for dogs and cats (and humans) are phenylalanine, leucine, methionine, lysine, isoleucine, valine, threonine, tryptophan, histidine and arginine. In addition, taurine, while technically not an amino acid but a derivative of cysteine, is an essential nutrient for cats and dogs.

The compositions described herein may additionally comprise nutritional supplements, e.g., carnitine and omega-3 or omega-6 fatty acids, in amounts known to those of skill in the art to avoid deficiency and maintain health. Carnitine, or L-carnitine, is a vitamin-like compound synthesized in the body from lysine and methionine. Carnitine may be naturally present in the ingredients of the present invention (e.g., flaxseed), or carnitine may be added to the compositions.

The compositions of the present invention may additionally comprise additives, stabilizers, fillers, thickeners, flavorants, palatability enhancers and colorants in amounts and combinations familiar to one of skill in the art. Stabilizing substances may increase the shelf life of the composition, and are known by those skilled in the art.

As contemplated herein, the compositions described may comprise a metabolizable energy content of from about 3500 to about 4500 kcal/kg. As referred to herein, "metabolizable energy" is the energy available to an animal upon consumption of the diet (or composition) after subtracting the energy excreted in feces, urine, and combustible gases. Metabolizable energy values may be determined following the protocols established by methods known by those of skill in the art, e.g., according to official guidelines produced by the Association of American Feed Control Officials (AAFCO).

By way of example, but without limitation, it is contemplated herein that a highly digestible composition, which is useful in the methods described herein, and which results in reduced stool volume, reduced stool weight, and reduce stool malodor may comprise: 36% corn gluten meal, 15% rice, 15% native rice starch, 6% dried egg, 6% low-ash poultry meal, calcium chloride, monosodium phosphate, and 1% ground ginger, and may further comprise carnitine, one or more amino acids, minerals and vitamins and one or more palatability enhancers. Specifically, said composition displays at least about 88.0% dry matter, and at least about 90% true protein, fat, carbohydrate, and energy digestibility.

While compositions of any consistency or moisture content are contemplated, preferably the compositions of the present invention may be, for example, a wet, semi-moist, or dry animal food composition. "Wet" food refers to food that has a moisture content of from about 70 to 90%. "Semi-moist" food refers to food that has a moisture content of from about 15% to 40%. "Dry" food refers to compositions from about 5% to 15% moisture content and is often manufactured in the form of small bits or kibbles. The kibble may then be dried and optionally coated with one or more topical coatings known by those skilled in the art, for example, flavors, fats, oils, powders, and the like. The compositions of the present invention can be prepared using conventional manufacturing methods.

The invention is not limited to the particular methodology, protocols, and reagents described herein because they may vary. Further, the terminology used herein is for the purpose of describing particular embodiments only and is not intended to limit the scope of the present invention.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Example 1

Experiment 1

Formulation of feline pet food compositions were designed in a multi-step process directed toward a highly-digestible composition that would reduce stool volume, weight, and odor. In an initial step, eight feline food compositions were prepared, each having the indicated amounts of the major ingredients as set forth in Table 1:

TABLE 1

| Composition Number | Native Rice Starch | Waxy Rice Starch | Native Corn Starch | Rice Blend | Ground Chicken | Corn Gluten Meal | Chicken Blend |
|---|---|---|---|---|---|---|---|
| 1 | 16% | — | — | 15% | 5% | 18.4% | — |
| 2 | — | — | — | 38% | 5% | 23.9% | — |
| 3 | — | 16% | — | 15% | 5% | 21.0% | — |
| 4 | — | — | — | 37% | — | 28.2% | — |
| 5 | 17.1% | — | — | 17% | — | 20.3% | 5.4% |
| 6 | 8% | — | — | 26.8% | 5.2% | 21.0% | — |
| 7 | — | — | — | 34.2% | 17.25% | 17.25% | — |
| 8 | — | — | 16% | 11.6% | 5% | 20.2% | — |

Composition 4 was analyzed as having 5.2% ash and 2.25% dietary fiber.

Experiment 2

Each of the eight compositions of Table 1 was subjected to a digestibility analysis along with a commercially-available feline pet food composition (designated as CA-1). CA-1 is currently marketed as a composition useful for healthy digestion and comprises 37% animal protein, 24% fat, 2% crude fiber and 7% ash. The results of those assays are provided in Table 2 below.

TABLE 2

| | DIGESTIBILITY (%) | | | | |
|---|---|---|---|---|---|
| Composition Number | True Protein | Dry Matter | Energy | Fat | Carbohydrate |
| 1 | 95.6 | 88.08 | 90.12 | 94.68 | 94.60 |
| 2 | 90.4 | 85.57 | 87.81 | 92.52 | 93.30 |
| 3 | 92.59 | 85.43 | 89.09 | 93.29 | 95.00 |
| 4 | 96.40 | 87.90 | 90.40 | 93.84 | 94.46 |
| 5 | 95.11 | 87.51 | 90.05 | 93.13 | 94.83 |
| 6 | 94.21 | 87.74 | 89.69 | 93.62 | 94.08 |
| 7 | 94.11 | 86.39 | 89.75 | 96.57 | 85.20 |
| 8 | 92.67 | 83.26 | 86.13 | 91.07 | 91.40 |
| CA-1 | 80.62 | 82.00 | 86.73 | 92.7 | 91.86 |

The data of Table 2 indicate that Compositions 4 and 5 exhibit substantially higher digestibility values for each of the components tested as compared to the other formulations tested.

Experiment 3

In light of the digestibility values obtained, Compositions 4 and 5 were selected for stool testing in a cross-over study and compared against CA-1. The data obtained with Composition 4 are provided in Table 3 while that obtained with Composition 5 are provided in Table 4:

TABLE 3

| | CROSS-OVER STOOL TESTING RESULTS | | |
|---|---|---|---|
| DIET | Mean Fecal Density (g/cc) | Mean Fecal Weight (g) | Mean Fecal Volume (cc) |
| CA-1 | 0.96 | 54.64 | 57.45 |
| Composition 4 | 0.93 | 41.88 | 44.75 |

TABLE 4

CROSS-OVER STOOL TESTING RESULTS

| DIET | Mean Fecal Density (g/cc) | Mean Fecal Weight (g) | Mean Fecal Volume (cc) |
| --- | --- | --- | --- |
| CA-1 | 0.97 | 54.40 | 55.90 |
| Composition 5 | 0.94 | 48.56 | 51.30 |

The data of Tables 4 and 5 indicated that Composition 4 appeared to be more effective than composition 5 in reducing both the mean fecal volume and weight in the felines tested.

Experiment 4

In addition to the above measurements, a "Litter Box Aroma Sensory Evaluation" was carried out with respect to Composition 4 (Table 5) and Composition 5 (Table 6). In both instances, the control diet was CA-1 of Table 2.

TABLE 5

LITTER BOX AROMA SCORES FOR OVERALL AROMA

| | COMPOSITION 4 | CA-1 |
| --- | --- | --- |
| Study Day 6 | 1.97 | 1.48 |
| Study Day 7 | 1.65 | 2.38 |
| Study Day 13 | 1.77 | 2.33 |
| Study Day 14 | 1.51 | 2.31 |

Rating Scale: 1 = No aroma at all; 3 = Moderate Aroma; 5 = Extremely strong aroma

TABLE 6

LITTER BOX AROMA SCORES FOR OVERALL AROMA

| | COMPOSITION 5 | CA-1 |
| --- | --- | --- |
| Study Day 6 | 2.30 | 2.09 |
| Study Day 7 | 1.82 | 1.77 |
| Study Day 13 | 2.11 | 2.01 |
| Study Day 14 | 2.14 | 2.12 |

Rating Scale: 1 = No aroma at all; 3 = Moderate Aroma; 5 = Extremely strong aroma The data of Tables 5 and 6 indicate that the formulation of Composition 4 appears to be substantially more effective than that of Composition 5 with respect to reducing fecal odor of excreta of the felines tested.

Experiment 5

In light of the data and trends noted above, a refined composition, Composition 9, was prepared, the main ingredients of which are approximately 36% corn gluten meal, 15% rice, 15% native rice starch, 6% dried egg, and 6% low-ash poultry meal. In addition calcium chloride was used to replace a portion of the normally-formulated calcium carbonate and monosodium phosphate used in the formulation of this composition as a mineral salt. The formulations were prepared without and with 1% ground ginger. The data obtained for the cross-over stool studies is presented in Tables 7 and 8. Composition 9 was compared against a standard indoor feline pet food composition which comprises 37% protein, 9.2% fat, 14.1% total dietary fiber and 6.2% ash (designated as CA-2.)

TABLE 7

CROSS-OVER STOOL TESTING RESULTS

| DIET | Mean Fecal Density (g/cc) | Mean Fecal Weight (g) | Mean Fecal Volume (cc) |
| --- | --- | --- | --- |
| CA-2 | 0.93 | 76.38 | 74.40 |
| Composition 9 | 0.73 | 26.21 | 20.69 |

TABLE 8

CROSS-OVER STOOL TESTING RESULTS

| DIET | Mean Fecal Density (g/cc) | Mean Fecal Weight (g) | Mean Fecal Volume (cc) |
| --- | --- | --- | --- |
| CA-2 | 1.02 | 75.13 | 73.61 |
| Composition 9 With 1% Ginger | 0.84 | 29.09 | 31.11 |

The data of Tables 7 and 8 demonstrate that administration of Composition 9 (with and without ginger) to feline animals provided a substantial decrease in the observed fecal density, weight, and volume as compared to the commercially-available feline pet food composition designated CA-2

Experiment 6

Further to the above, a litter box aroma evaluation study was carried out with Composition 9, both with and without ginger. Composition 9 was compared against CA-2. In this experiment, participants were asked to rank various aroma attributes, rather than just aroma strength. The data was collected on feeding days 6, 7, 13 and 14. The data obtained are provided in Table 9:

TABLE 9

AROMA DESCRIPTOR RATINGS FOR LITTER BOX AROMA

| DIET | CA-2 | Composition 9 | CA-2 | Composition 9 With 1% Ginger |
| --- | --- | --- | --- | --- |
| Ammonia | 1.56 | 1.46 | 1.83 | 1.58 |
| Fresh feces | 2.10 | 1.69 | 2.43 | 1.83 |
| Putrid | 1.34 | 1.33 | 1.44 | 1.23 |
| Green/grassy | 1.15 | 1.14 | 1.21 | 1.23 |
| Sour | 1.43 | 1.38 | 1.48 | 1.41 |
| Sweet | 1.15 | 1.19 | 1.11 | 1.19 |
| Floral | 1.11 | 1.12 | 1.09 | 1.15 |
| Woody | 1.01 | 1.01 | | |
| Musty/damp | | | 1.03 | 1.04 |
| Dirt/clay | | | 1.02 | 1.02 |
| Motor Oil | | | 1.00 | 1.00 |
| Metallic | | | 1.00 | 1.01 |

Rating Scale: 1 = No aroma at all 3 = Moderate Aroma 5 = Extremely strong aroma

Using the above scale of 1-5, it is preferable that pleasant scents including green/grassy, sweet, floral and woody are higher in value and unpleasant scents such as ammonia, fresh feces, putrid, sour, musty/damp, dirt/clay, motor oil and metallic are lower in value. From the results, Composition 9 had higher values for sweet and floral, indicating Composition 9 was improved for the "pleasant" scents over CA-2 for two of the four "pleasant" scents tested. Composition 9 had lower values for ammonia, putrid, fresh feces and sour, indicating Composition 9 was improved for the "unpleasant" scents over CA-2 for all four of the "unpleasant" scents tested.

Composition 9 with ginger had higher values for green/grassy, sweet and floral, indicating Composition 9 with ginger was improved for the "pleasant" scent over CA-2 for all three of the "pleasant" scents tested. Composition 9 had lower values for ammonia, putrid, fresh feces and sour, indicating Composition 9 with ginger was improved for the "unpleasant" scents over CA-2 for four of the eight "unpleasant" scents tested.

Experiment 7

The pH and ammonium content of the urine produced by the test felines fed either Composition 9 or CA-2 were also measured, and the data obtained are presented in Table 10:

TABLE 10

| Ammonium Content (%) And pH Of Urine | | |
| --- | --- | --- |
| DIET | Ammonium (%) | Urine pH |
| CA-2 | 0.3054 | 6.37 |
| Composition 9 | 0.2468 | 6.24 |

The data of Table 10 reveal that the urine produced by the felines fed Composition 9 had a significantly lower pH and a significantly lower level of ammonia, a volatile component of urine. It is therefore expected that feeding a feline the formulation according to Composition 9 would result in a reduction in urine odor as well.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

What is claimed is:

1. A method for improving stool quality in an animal in need thereof, the method comprising causing the animal in need thereof to ingest a stool improving quality amount of a dry food composition comprising:
   from 36% to 60% vegetable protein;
   from 5% to 30% whole grain;
   from 5% to 20% starch;
   from 2% to 10% non-meat animal protein;
   from 2% to 15% low-ash animal protein;
   wherein a dry matter digestibility of the composition is at least 88%;
   wherein a dietary fiber content of the composition is less than 5%; and
   wherein the improving stool quality in the animal in need thereof comprises at least one of a reduction in stool volume, a reduction in stool weight, and a reduction in the odor of excreta produced by the animal.

2. The method of claim 1, wherein said composition comprises a water-soluble calcium salt.

3. The method of claim 2, wherein the water-soluble calcium salt is $CaCl_2$.

4. The method of claim 1, wherein said composition comprises a water-soluble phosphate salt.

5. The method of claim 4, wherein the water-soluble phosphate salt is $NaH_2PO_4$.

6. The method of claim 1, wherein the starch is native rice starch and comprises from about 9% to about 16% of the composition.

7. The method of claim 3, wherein the vegetable protein is corn gluten meal.

8. The method of claim 7, wherein the non-meat animal protein is dried egg and comprises from about 4% to about 8% of the composition.

9. The method of claim 8, wherein the low-ash animal protein is low-ash poultry meal and comprises from about 4% to about 8% of the composition.

10. The method of claim 9, wherein said composition has a total ash content of about 5% or less.

11. The method of claim 10, further comprising feeding the animal in need thereof an excreta odor suppressing amount of a zingiberaceous spice.

12. The method of claim 11, wherein the zingiberaceous spice is ginger.

13. The method of claim 11, further comprising feeding the animal in need thereof an excreta odor suppressing amount of a zinc salt.

14. The method of claim 13, wherein the animal is a feline.

15. The method of claim 13, wherein the animal is a canine.

16. The method of claim 1, wherein a true protein digestibility of the composition is at least about 90%.

17. The method of claim 1, wherein a carbohydrate digestibility of the composition is at least about 90%.

18. The method of claim 1, wherein a fat digestibility of the composition is at least about 90%.

19. The method of claim 1, wherein the composition comprises a water-soluble calcium salt having a water solubility relatively greater than calcium carbonate.

* * * * *